United States Patent
Chiku et al.

[11] 3,886,442
[45] May 27, 1975

[54] BATTERY STATE-OF-CHARGE INDICATOR

[75] Inventors: Takewo Chiku, Toyota; Shin Yamamoto; Mikio Huruhashi, both of Nagoya, all of Japan

[73] Assignee: Kabushiki Kaisha Toyota Chuo Kenkyusho, Nagoya-shi, Japan

[22] Filed: Apr. 12, 1974

[21] Appl. No.: 460,466

[30] Foreign Application Priority Data
Apr. 16, 1973 Japan............... 48-43463

[52] U.S. Cl................ 324/29.5; 320/19
[51] Int. Cl. ........................ G01n 27/42
[58] Field of Search............... 324/29.5; 320/19

[56] References Cited
UNITED STATES PATENTS

| | | | |
|---|---|---|---|
| 3,546,576 | 12/1970 | Frezzolini | 324/29.5 |
| 3,787,754 | 1/1974 | Seabase | 324/29.5 |
| 3,805,157 | 4/1974 | Acks | 324/29.5 |

*Primary Examiner*—Alfred E. Smith
*Assistant Examiner*—Michael J. Tokar
*Attorney, Agent, or Firm*—Berman, Bishoff & Platt

[57] ABSTRACT

A battery state-of-charge indicator to accurately measure and indicate the actual state-of-charge of a secondary battery, which comprises a compensation circuit for converting a discharging current of the battery to a compensated current substantially satisfying an equation $I=mI_B^n$ and an integrator for storing an ampere-hour corresponding with the known fully charged capacity of the battery and detecting a difference between an ampere-hour integrated therein from the compensated current and the stored ampere-hour to read the actual state-of-charge of the battery. In the above-equation, the characters $I$ and $I_B$ are the compensated current and the discharging current respectively and the constants $m$ and $n$ are experimentally defined by the changes of the known fully charged battery capacity in relation to the changes of the discharging current to satisfy Peukert Equation.

10 Claims, 8 Drawing Figures

BATTERY STATE-OF-CHARGE INDICATOR

BACKGROUND OF THE INVENTION

The present invention relates to a battery state-of-charge indicator, and more particularly to an actual state-of-charge indicator for a secondary battery used as a power source for an electrically powered vehicle and the like.

Air pollution caused by exhaust gas of automobiles has recently been taken up as a big social problem. And electrically powered automobiles are seriously discussed as anti-pollution wheeled vehicles. For practical use of electrically powered automobiles, however, there appears to be many difficulites which remain unsolved. One of the difficulties exists in the electrical energy sources in the form of secondary batteries installed within the automobiles. Such an ideal secondary battery has not yet been developed as is small in size but of a big charge capacity to allow a long hour contenuous drive of a vehicle after it is fully charged once.

Under the today's circumstances, therefore, it is considered indispensable for practical use of an electrically powered automobile to develope and provide a practical method to accurately measure and indicate the actual state-of-charge of a battery at any one time so as to warn the vehicle operator of the necessity of the battery recharge well in advance.

There have been introduced some methods to detect the actual state-of-charge of a battery as, a. to detect the specific gravity of the battery electrolyte, b. to measure the terminal voltages of the battery, and c. to use a coulometer to measure the ampere-hour integral out of the battery.

Some indicating devices adapting one of the mentioned methods have actually been put in practical use. None of conventional state-of-charge indicators are satisfactorily compensated for changes of the battery capacity caused by various discharge amounts and by changes of ambient temperatures.

In practical use of the battery for the electrically powered automobile, there will be various changes of current supply to provide electric load circuits and of the ambient temperatures. These changes affect the battery to cause its capacity changes. Thus, with a conventional non-compensated indicator, the vehicle operator cannot be informed of the actual state-of-charge of the battery and will have the battery to be fully discharged to unable the drive of the vehicle on way.

There are introduced some state-of-charge indicators compensated for the changes of the battery capacity. The compensation means are, however, commonly complicated in their constructions and operations and of a high production cost, which remains as the difficulties for practical use.

SUMMARY OF THE INVENTION

The present invention is directed to solve such problems existing with the conventional battery state-of-charge indicators.

The state-of-charge of the battery is, as well-known, represented by the difference between the known fully charged battery capacity and the net ampere-hours removed.

The following equation (1) expresses the above relation;

$$C = T - R \quad (1)$$

C: State-of-Charge of the battery
T: Known Fully Charged Battery Capacity
R: Net Ampere-Hours Removed In the practical use of the battery, the known fully charged battery capacity T substantially varies caused by the changes of the battery discharge to the electric load circuits and/or the ambient temperatures. This unables the accurate measuring of the actual state-of-charge of the battery by way of an operational circuit for integrating the ampere-hours removed so as to perform the mentioned equation.

The above discussion may become more realistic when referred to FIG. 1 of the accompanying drawings, wherein the axis of abscissas and the axis of ordinates indicate respectively the discharging current (unit A) and the known fully charged battery capacity (unit AH) under a constant ambient temperature of 30°C. FIG. 1 depicts the experimental results of a lead-acid battery for electrically powered automobiles, the battery being of the following specifications and called hereinafter simply as Battery E - 125;

| Model: | E – 125 |
| --- | --- |
| Manufacturer: | Nihon Denchi K.K. |
| Type: | Paste Type For Electrically Powered Automobiles |
| Dimensions: | |
| Total Height | 262mm (257)mm |
| Box Height | 212mm |
| Depth | 505mm |
| Width | 182mm |
| Gross Weight with Electrolyte: | 37.5 kg |
| Rated Capacity: | 125 AH/5 H.R. |

In FIG. 1, a dot-dash line $a$ shows relation between the discharging current and the known fully charged capacity of a battery of which the fully charged capacity has no influence of the discharging current and which is called hereinafter as "Ideal Battery".

As seen in FIG. 1, the capacity of the ideal battery is constant with linear characteristics regardlessly to the changes of the discharge of the battery. A solid non-linear line $b$ indicates the exponential-functional relation between the known fully charged battery capacity and the discharging current of the practical battery under influence of the discharging current. This solid non-linear line $b$ corresponds to the under-presented equation (2) known as Peukert Equation;

$$C = \frac{m}{I^{n-1}} \quad (2)$$

C: Known Fully Charged Battery Capacity
I: Discharging Current
m & n: Constants

In the actual experiment, for example, Battery E - 125 defines the constants $m$ and $n$ to be 304 and 1.29 respectively. Consequently, the equation (2) $C = m/I^{n-1}$ can be expressed as $C = 304/I^{0.29}$, an equation (3), which corresponds to the non-linear line $b$ in FIG. 1.

Now it may well be observed that in FIG. 1, when the discharging current takes a value $d$ on the axis of abscissas, a co-ordinate $a_1$ on the dot-dash line $a$ pinpoints an ordinate $a_2$ expressing a fully charged battery capacity to correspond with the discharging current $d$. In the practical use of the battery, a co-ordinate $b_1$ on the solid line $b$ indicates an actual relation between the fully charged battery capacity and the discharging current. An ordinate then is $b_2$, which shows a capacity difference $\Delta C$ between the ideal and practical batteries.

The capacity difference $\Delta C$ has to be compensated for accurate measuring and indication of the actual state-of-charge of the battery at any one time. The present invention discusses a compensation means for the capacity difference $\Delta C$ through an unique approach to consider that the full charge condition is fixed independently to the changes of the discharging current. In this instance, a virtual discharge amount is defined to have an additional change by the amount $\Delta C$ in comparison with the actual ampere-hours removed. This enables to give appropriate compensation to the equation (1). The inventive approach was completed by a simple compensation method to adopt an experimental equation to convert a detected discharge current across the load circuits into a corresponding compensated discharge current. Thus, the actual state-of-charge of the battery can be lead out through a deduction of the compensated discharge capacity responsive to the compensated discharging current from the virtually fixed full charge capacity.

The present invention is intended to provide an actual state-of-charge of the battery indicator with simply designed circuits which enable direct deduction from the virtually fixed battery capacity a compensated discharge capacity. For realization of the above-desired indicator, an under-mentioned equation (4) is experimentally defined and provided is a compensation circuit to substantially satisfy the equation (4).

$$I = m I_B^n \quad (4)$$

$I$: Compensated Discharge Current
$I_B$: Actual Discharge Current
$m$ & $n$: Constants to satisfy Peukert Equation When the difference capacity $\Delta C$ as viewed in FIG. 1 is converted to be a change amount $d'$ of the discharging current, an equation (5) is lead as;

$$d' = \frac{(a_2 - b_2)}{b_2/d} \quad (5)$$

Then, this $d'$, a current to be compensated, is added $$D = d + d' = d + \frac{(a_2 - b_2)}{b_2/d} \quad (6)$$

the actual discharge current, which is represented by an equation (6). And the time integrals of the result value from the equation (6) is defined to be the compensated discharge capacity.

$D$: Compensated Discharge current
$d$: Actual Discharge Current
$d'$: Current to be compensated FIG. 2 indicates relation between the actual discharge amount (unit AH) on the axis of abscissas and the compensated discharge amount (unit AH) on the axis of ordinates when the actual values read from FIG. 1 are substituted for the equation (6). The figures applied to FIG. 2 are obtainable through time-integration of the actual discharge current and of the compensated discharge current. Thus, a co-ordinate on a non-linear line U shows an ordinate representing a virtual or compensated discharge capacity corresponding to any abscissa. The compensated capacities corresponding to the actual discharge capacities become readable from FIG. 2. This FIG. 2 was completed based on Battery E -125 and various experiments conducted with other batteries have commonly proved FIG. 2 to be correct. Thus, the equation (4) representing the line U has been defined to be applicable onto batteries of all the kinds.

As explained, the reference characters $m$ and $n$ indicate constants; in the case of Battery E – 125, they are 304 and 1.29 respectively. These constants $m$ and $n$ differ by the specific rating of each different type of battery. And on each battery, experiments should be conducted to complete its relative figure represented by FIG. 2. For each different battery, any two co-ordinates on the characteristic line are then selected to determine the corresponding values on the axes of abscissas and ordinates. The determined values are to be applied onto the Peukert Equation (2) to lead out the values of the constants $m$ and $n$. The obtained values of the constants $m$ and $n$ are then used for to complete the equation (4) for the selected battery.

According to the present invention, there is provided with an actual state-of-charge indicator for a secondary battery which comprises a detecting means for detecting a discharging current exerting within an electric load circuit driven by the battery, a compensation means for converting the discharging current to a compensated current substantially satisfying an equation $I = m I_B^n$, the characters $I$ and $I_B$ being the compensated current and the discharging current respectively, and the constants $m$ and $n$ being experimentally defined by the changes of the known fully charged capacity of the battery in relation to the changes of the discharging current to satisfy Peukert Equation, an integration means for storing an ampere-hour corresponding with the known fully charged battery capacity therein and detecting an actual state-of-charge of the battery by means of a difference between an ampere-hour integrated therein from the compensated current and the stored ampere-hour, and an indicating means for reading the actual state-of-charge of the battery.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

A first and a second preferred embodiments of the present invention which will be hereinafter discussed in detail are commonly provided respectively with a compensation circuit for error correction in measuring and indicating the actual state of charge of the battery. And the second embodiment is additionally featured by a temperature compensation circuit for compensating the changes of the known fully charged battery capacity caused by the changes of the ambient temperatures.

Figure 3:
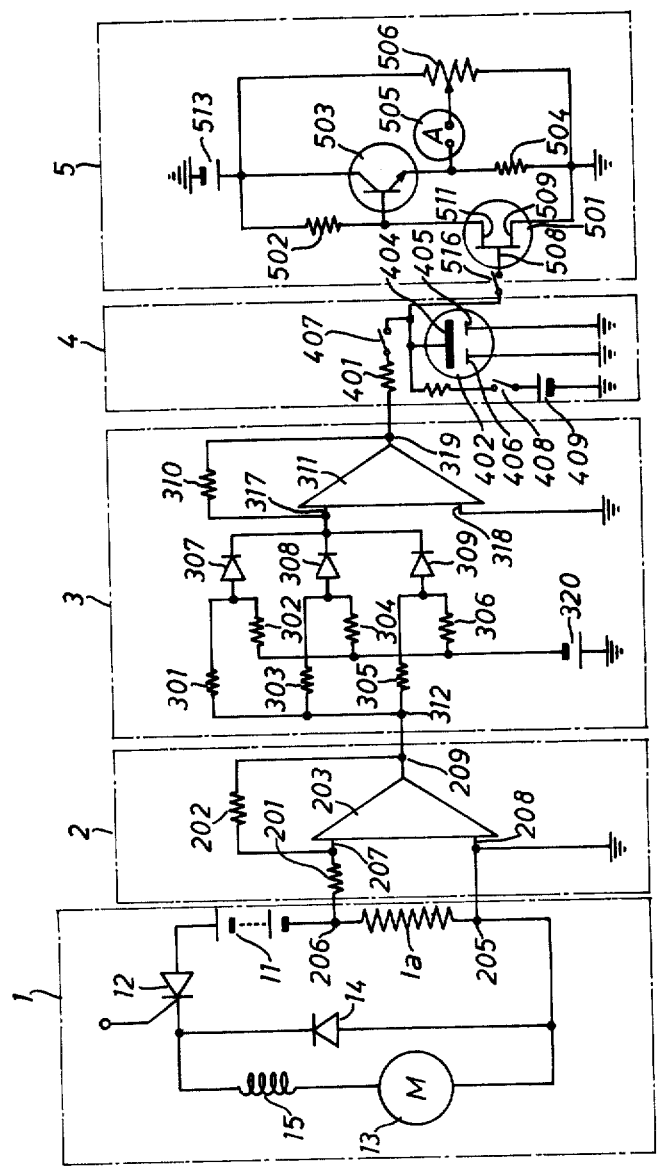
FIG. 3 is a schematic circuit diagram of a first embodiment of an actual state-of-charge indicator in accordance with the present invention.

Referring now to the drawings particularly in FIG. 3, there is illustrated the first preferred embodiment of a secondary battery state-of-charge indicator in accordance with the present invention. The indicator comprises a shunt resistor $1a$ disposed within a motor driving apparatus 1 for an electrically driven vehicle, an amplifying circuit 2 to amplify discharge current of a secondary battery 11 for the motor driving apparatus 1, a compensation circuit 3 to convert the output voltage of the amplifying circuit 2 into a compensated voltage signal substantially satisfying the above-mentioned equation $I=mI_B{}^n$, an integrator 4 to detect an actual state-of-charge of the battery 11 by means of a difference between the compensated voltage and a predetermined potential memorized therein corresponding with the known fully charged battery capacity, and a read-out circuit 5 to read the actual state-of-charge of the battery 11.

The motor driving apparatus 1 includes an electric load circuit which comprises the battery 11, a silicon controlled rectifier 12 for a conventional chopper control device (not shown), a direct current motor 13 connected in series with the battery 11 through the rectifier 12 and a reactor 15 therefor to be controlled by the chopper control device, and a diode 14 in parallel with the motor 13 and the reactor 15. The diode 14 has a function to protect the motor driving circuit 1. The chopper control device is substantially a non-contact switch means including an oscillator, the rectifier 12 and a current control means, thereby to control the driving operation of the motor 13 in accordance with the on-off time interval thereof in a frequency range of scores hertz to hundred hertz.

The motor driving circuit 1 further includes the shunt resistor $1a$ which is interposed between terminals 205 and 206 positioned respectively at the motor side and the battery side and exerts a voltage signal therein in response to discharge current of the battery 11. At the terminals 205 and 206 of the shunt resistor $1a$, connected are positive and negative terminals of the amplifying circuit 2 in which the voltage signals appearing between the terminals 205 and 206 are amplified.

The amplifying circuit 2 includes an operational amplifier 203 of which the positive terminal 208 is connected to the terminal 205 and grounded, and the negative terminal 207 is connected to the terminal 206 through an input resistor 201 and connected to an output terminal 209 of the operational amplifier 203 through a feed-back resistor 202. Thus, the amplifying circuit 2 is preliminarily set to have a desired amplifying ratio by means of the input and feed-back resistors 201 and 202 so as to amplify the voltage signals from the shunt resistor $1a$ and applies the amplified voltage to the compensation circuit 3 through the output terminal 209 thereof.

Figure 4:
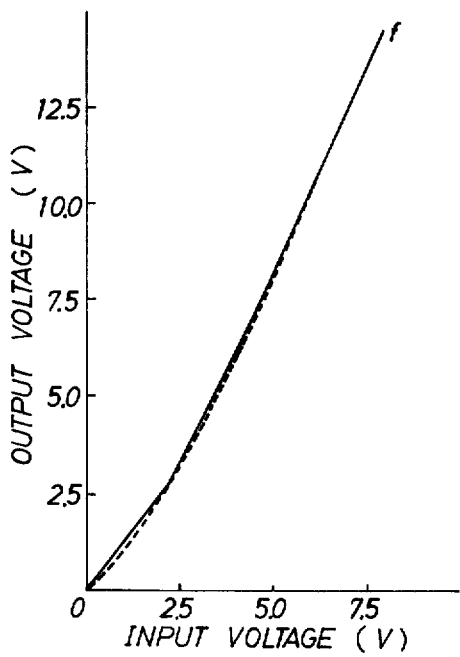
FIG. 4 is a graphic chart showing a segmental characteristic line of a compensation circuit shown in FIG. 3, wherein the axis of abscissas indicates an input voltage to be compensated by the compensation circuit and the axis of ordinates shows an output voltage of the compensation circuit.

To realize the segmental characteristics, shown in FIG. 4, substantially satisfying the mentioned equation $I=mI_B{}^n$, the compensation circuit 3 comprises an operational amplifier 311, diodes 307, 308 and 309 connected to a negative terminal 317 of the operational amplifier 311, bias resistors 301 to 306 for controlling each conduction of the didoes 307 to 309 and a feed-back resistor 310 connected at its both ends to the negative terminal 317 and an output terminal 319 of the amplifier 311. The bias resistors 301 and 302, 303 and 304, and 305 and 306 are connected in parallel to each other respectively, the resistors 301, 303 and 305 being connected at each one end thereof to the output terminal 209 through a common junction 312 and the resistors 302, 304 and 306 being grounded at each one end thereof by way of a battery 320. The diodes 307 to 309 are connected at their cathodes to the negative terminal 317 of the operational amplifier 311 whose positive terminal 318 is grounded, and connected at their anodes to the other ends of the resistors 301 and 302, 303 and 304, and 305 and 306 respectively.

In this compensation circuit 3, the resistance values of the bias resistors 301 and 302 are predetermined to conduct only the diode 307 when an output voltage $e_1$ of the amplifying circuit 2 is applied to the input terminal 312 of the compensation circuit 3, while, in this instance, the diodes 308 and 309 are non-conductive due to the bias resistors 303 through 306. The resistance values of the bias resistors 303 and 304 are also predetermined to conduct the didoes 307 and 308 when an amplified voltage $e_2$ higher than the output voltage $e_1$ is applied to the input terminal 312, while, in this instance, the diode 309 is conditioned to its non-conductive state due to the bias resistors 305 and 306. The resistance values of the bias resistors 305 and 306 are designed to conduct all the diodes 307, 308 and 309 when an amplified voltage $e_3$ higher than the output voltage $e_2$ is applied to the input terminal 312.

When output voltages of the operational amplifier 311 are represented by characters $e_{10}$, and $e_{20}$ and $e_{30}$ respectively responsive to the above described output voltages $e_1$, $e_2$ and $e_3$ of the amplifying circuit 2, the output voltage $e_{10}$ of the operational amplifier 311 is shown as the following equality.

$$e_{10} = -R_{310} i_{d1}$$

And, the output voltages $e_{20}$ and $e_{30}$ of the operational amplifier 311 are respectively represented by the below equalities.

$$e_{20} = -R_{310}(i_{d1} + i_{d2})$$
$$e_{30} = -R_{310}(i_{d1} + i_{d2} + i_{d3})$$

In the above equalities, the characters $i_{d1}$, $i_{d2}$ and $i_{d3}$ represent currents flowing across the diodes 307, 308 and 309 respectively. The character $R_{310}$ means a resistance value of the feed-back resistor 310. The minus character (−) in the above equations are due to the phase inversion characteristics of the operational amplifier 311.

Figure 1:
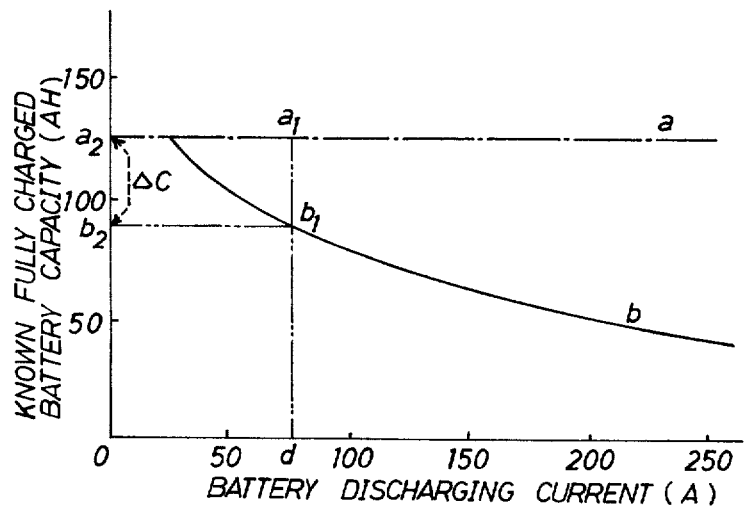
FIG. 1 is a graphic chart showing the changes of the known fully charged capacity of a secondary battery in relation to the changes of the discharge current of the battery.
Figure 2:
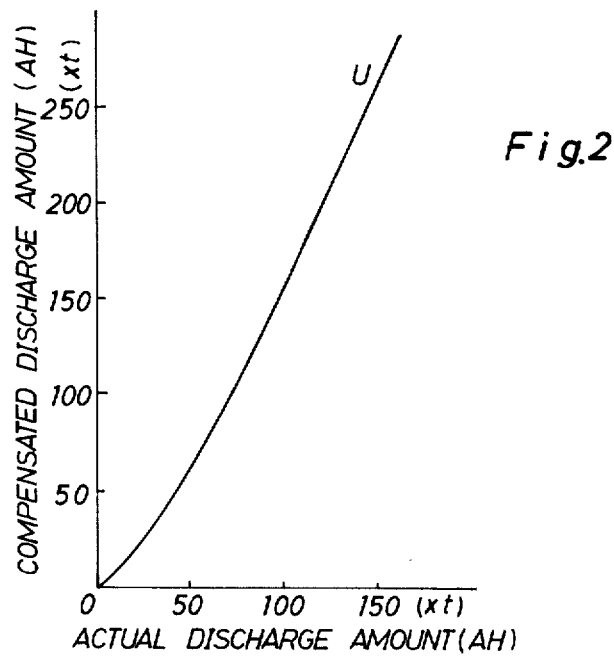
FIG. 2 depicts a non-linear characteristic line satisfying the mentioned equation $I = m I_B^n$, wherein the axis of abscissas shows the actual discharge amount of the battery and the axis of ordinates indicates the compensated discharge amount when the actual values readable on FIG. 1 are substituted for the mentioned equation (6)

Thus, the compensating characteristics of the circuit 3 are illustrated in FIG. 4 in which the axis of abscissas and the axis of ordinates represent respectively the input voltage and the output voltage of the compensation circuit 3. In FIG. 4, a segmental line $f$ indicates the change of the said output voltage against the said input voltage and approximately resembles the characteristic line U representing the equation $I=mI_B^n$ as shown in FIG. 2.

The integrator 4 substantially comprises a potential memory cell or element 402 which has an anode 404 connected to the output terminal 319 of the compensation circuit 3 through the resistor 401 and a first switch 407. The potential memory element 402 further includes a cathode 406 which is grounded and a refernce electrode 405 which is grounded. The andoe 404 is further connected to a battery 409 through a third switch 408 and connected to an input terminal 508 of the read-out circuit 5 by way of a second switch 516. The integrator 4 is additionally provided with an input resistor 401 to determine a desired value range of currents flowing therethrough. The first and second switches 407 and 516 are interlocked with a main switch (not shown) to activate the motor driving apparatus 1, and the third switch 408 is manually actuated to connect the battery 409 with the potential memory element 402. The anode 404 is made of silver selenide compound and the cathode 406 of silver, the anode 404 and the cathode 406 being deposited on the both surfaces of a solid electrolyte which is essentially made of silver iodide compounds with high ionic conductivity.

In the integrator 4, when the andoe 404 and the cathode 406 of the potential memory element 402 are connected to the positive and negative electrodes of the battery 409 through a resistor by closure of the third switch 408, the potential memory element 402 stores a certain amount of ampere-hour therein corresponding with the known fully charged capacity of the battery 11. Upon opening of the third switch 408, the potential memory element 402 holds the ampere-hour stored therein as the first and second switches 407 and 516 are opened. When the first and second switches 407 and 516 are closed, the potential memory element 402 discharges the stored ampere-hour therefrom in accordance with negative potential appearing on the output terminal 319 of the compensation circuit 3 to detect the actual state-of-charge of the battery 11 at any one time. In other words, the actual state-of-charge of the battery 11 is detected by means of subtraction of an ampere-hour amount corresponding with a discharging current of the battery 11 from the stored ampere-hour within the potential memory element 402. Thus, the potential memory element 402 functions as an element which integrates the ampere-hours out of the battery 11.

The read-out circuit 5 includes a field effect transistor 501 (hereinafter called as FET), a load resistor 502, a transistor 503, an emitter resistor 504, an amperemeter 505, a battery 513 and a resistor 506. The FET 501 is connected at its gate 508 to the anode 404 of the potential memory element 402 through the second switch 516, connected at its drain 511 to a positive electrode of the battery 513 through the resistor 502, and grounded at its source 509. The transistor 503 is connected at its base to the drain 511 of the FET 501, connected at its collector to the battery 513 and grounded at its emitter through the resistor 504. The transistor 503, the resistors 504 and 506 and the amperemeter 505 form a conventional bridge circuit in which the amperemeter 505 indicates an ampere-hour amount corresponding with an input potential applied to the gate 508 of the FET 501 from the anode 404 of the potential memory element 402 to read out the actual state-of-charge of the battery 11.

In the practical use of the secondary battery state-of-charge indicator described above, firstly the third switch 408 is manually closed to complete connection between the anode 404 of the potential memory element 402 and the battery 409. This stores into the potential memory element 402 an ampere-hour amount corresponding with the known fully charged capacity of the battery 11 during the closure of the third switch 408. Secondly, the first and second switches 407 and 516 are closed in response to the activation of the motor driving apparatus 1 in the opening condition of the third switch 408.

In this state, when a discharging current of the battery 11 flows in the motor driving apparatus 1 in response to the operating conditions of the motor 13 regulated by the chopper control device, a voltage signal appears between the terminals 205 and 206 of the shunt resistor 1$a$ to be applied to the input terminals 207 and 208 of the amplifying circuit 2. This voltage signal is amplified by the operational amplifier 203 in accordance with the amplifying ratio given by the resistor 201 and 202 and, in turn, applied to the input terminal 312 of the compensation circuit 3.

In the compensation circuit 3, the didoes 307, 308 and 309 are selectively conducted in accordance with a value of the input voltage appearing at the input terminal 312 to satisfy the segmental characteristic line $f$ shown in FIG. 4. Consequently, at the input terminal of the integrator 4, applied is a compensated voltage amplified by the amplifier 311 in response to the conduction of the diodes 307 through 309. When this compensated voltage is applied to the anode 404 of the potential memory element 402 by way of the resistor 401 and the first switch 407, the memory element 402 integrates the ampere-hour amounts corresponding with the compensated voltages and the ampere-hour amounts are subtracted from the mentioned stored ampere-hour within the memory element 402 to detect the actual state-of-charge of the battery 11. Subsequently, the actual state-of-charge is indicated on the amperemeter 505 at any one time to warn the operator of the necessity of the battery recharge well in advance.

Figure 6:
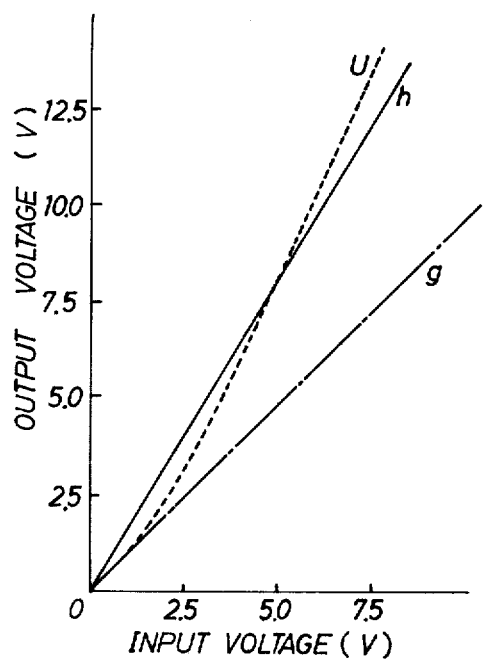
FIG. 6 is a graphic chart showing a linear characteristic line of a compensation circuit of the second embodiment, wherein the axis of abscissas indicates an input voltage to be compensated by the compensation circuit and the axis of ordinates shows an output voltage of the compensation circuit.
Figure 5:
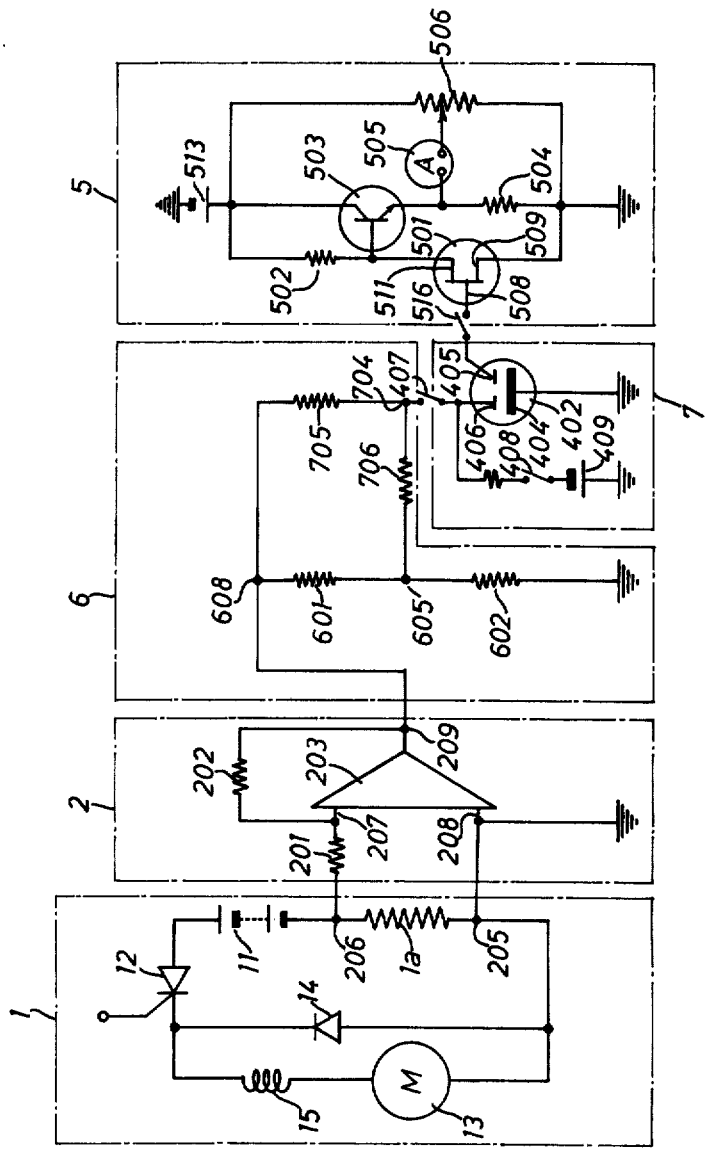
FIG. 5 is a schematic circuit diagram of a second embodiment of the present invention.

FIGS. 5 and 6 illustrate a second preferred embodiment of the present invention wherein a compensation circuit 6 corresponding with the above described compensation circuit 3 is adapted to realize a linear characteristic line $h$ as shown in FIG. 6 approximately satisfying the mentioned equation $I=mI_B^n$.

In this second embodiment, the distinguished differences from the first embodiment are observed in the construction of the compensation circuit 6 and an integrator 7. The constructions and functions of the motor driving apparatus 1, the amplifying circuit 2, the potential memory element 402 and the read-out circuit 5 are same as those in the first preferred embodiment. Thus, the same reference numerals indicate the same components and eliminated are repetition of the explanations already made in the previous embodiment.

The compensation circuit 6 comprises resistors 601, 602, 705 and 706. The resistor 601 is connected at its one end 608 to the output terminal 209 of the amplifying circuit 2. The resistor 602 is connected at its one end 605 in series with the resistor 601 and is grounded at its other end. The resistors 705 and 706 are connected at the one end thereof to the junction 605 and the terminal 608 respectively, and also connected at a junction 704 of the other end thereof to an input terminal of the integrator 7 so as to determine a desired value range of currents flowing through the integrator 7. In FIG. 6, there is shown the linear characteristic line $h$ to determine the resistance values of the resistors 601 and 602. In this figure, the axes of abscissas and ordinates show respectively the input and output voltages of the compensation circuit 6. Characters U and $g$ represent respectively a characteristic curve satisfying the mentioned equation $I=mI_B{}^n$ and a linear line showing the change of voltage applied to the one end 608 of the resistor 601. The resistors 601 and 602 are to be selected to have such resistance values thereof that a difference voltage obtainable from the characteristic lines $h$ and $g$ is applied to the junction 605 in accordance with the change of voltage appearing at the said terminal 608.

The integrator 7 is characterized in that positive voltages appearing at the junction 704 is applied to the cathode 406 of the potential memory element 402. In this integrator 7, the cathode 406 is connected to the junction 704 by way of the first switch 407, and further connected to the negative electrode of the battery 409 through a resistor and the third switch 408. The battery 409 is grounded at the positive electrode thereof. The potential memory element 402 is further connected at its reference electrode 405 to the input terminal 508 of the read-out circuit 5 by way of the second switch 516, and also grounded at its anode 404.

In the practical use of this second embodiment, initially the third switch 408 is manually closed to connect the cathode 406 of the memory element 402 to the battery 409. This stores into the memory element 402 an ampere-hour amount corresponding with the known fully charged capacity of the battery 11 during the closure of the third switch 408. Subsequently, the first and second switches 407 and 516 are closed in response to the activation of the motor driving apparatus 1 in the opening condition of the third switch 408. Under this condition, when a discharge current of the battery 11 flows in the motor driving apparatus 1, a voltage signal between the terminals 205 and 206 of the shunt resistor 1a is amplified by the amplifying circuit 2 and, in turn, applied to the terminal 608 of the compensation circuit 6.

In the compensation circuit 6, the amplified voltage from the amplifying circuit 2 appears at the terminal 608 to be applied to the cathode 406 of the memory element 402 across the resistor 705. At the same time, a voltage divided by the resistors 601 and 602 appears at the junction 605 to be applied to the said cathode 406 through the resistor 706. Consequently, at the cathode 406 of the memory element 402 or the input terminal of the integrator 7, applied is a compensated positive voltage corresponding with the above described characteristic line $h$ as shown in FIG. 6. When this compensated voltage is applied to the cathode 406, the memory element 402 integrates the ampere-hour amounts corresponding with the compensated voltages and the integrated ampere-hour is subtracted from the mentioned stored ampere-hour within the memory element 402 to detect the actual state-of-charge of the battery 11. Subsequently, the actual state-of-charge is indicated on the amperemeter 505.

It has heretofore been discussed that error corrections in indicating accurately the actual state-of-charge of a secondary battery can be satisfactorily made by way of the above disclosed first or second preferred embodiment of the present invention. It is, however, well known the battery state-of-charge is influenced by the changes of the ambient temperatures. To complete more accurate state-of-charge indication, the changes of the battery state-of-charge caused by the ambient temperature changes should be appropriately compensated over the compensation realized in the first and second embodiments.

This temperature compensation will become necessary particularly when the battery 11 is used in such an area where there are temperature changes to a certain extent. This invention is, therefore, furthermore directed to satisfy the temperature compensation. And experiments were conducted with Battery E-125 to complete FIG. 7.

Figure 7:
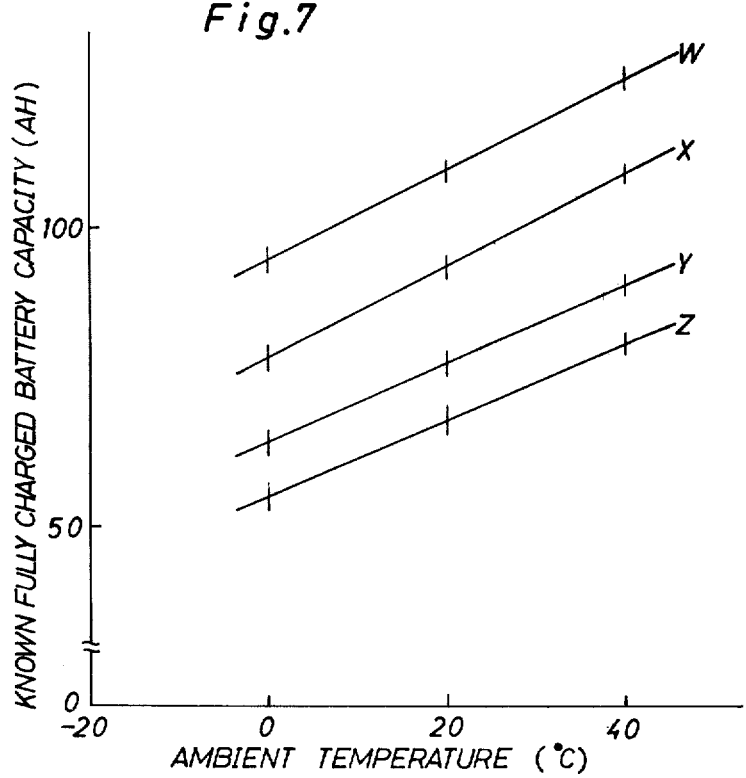
FIG. 7 illustrates the changes of the known fully charged capacity of a secondary batter in relation to the changes of ambient temperature of the battery.

In FIG. 7, the axes of abscissas and ordinates indicate respectively the ambient temperature in centigrade degrees and the known fully charged capacity of the Battery E-125 percentagewise. Linear characteristic lines W, X, Y and Z were experimentally obtained to indicate changes of the known fully charged capacity of the battery in relation to the ambient temperature changes respectively at fixed discharging currents in values of 25A, 50A, 100A and 150A. Further experiments on other kinds of batteries have proven the characteristic lines W, X, Y and Z in FIG. 7 are well applicable on any other kind of battery of the same type.

A substantially common change ratio is obtainable for the battery capacity changes in respect with the ambient temperatures from the fact that the linear lines W, X, Y and Z in FIG. 7 are substantially parallel to one another or all the lines having a substantially common angle to the axis of abscissas. This indicates that the battery capacity changes in respect to the ambient temperature changes can be compensated easily independently to the changes of the discharging current. To realize more accurate indication of the actual state-of-charge of the battery, the temperature compensation has only to be conducted on the compensated voltage appearing as the output voltage from the compensation circuit 3 in the first embodiment.

Figure 8:
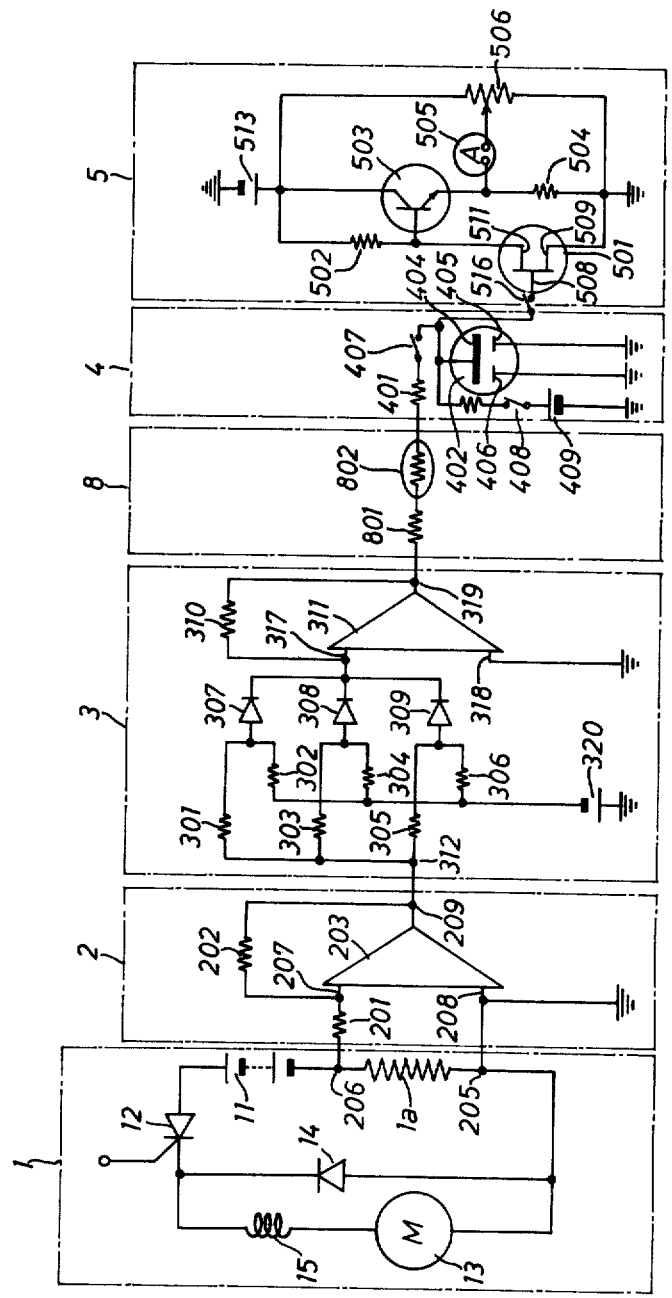
FIG. 8 is a schematic circuit diagram of a third embodiment of the present invention.

Accordingly, in refernce with FIG. 8, a third preferred embodiment discloses such a battery state-of-charge indicator as provided with the temperature compensation based on the indicator discussed previously in refernce with FIG. 3. The third preferred embodiment is characterized by an ambient temperature compensation circuit or second compensation circuit 8 interposed between the compensation circuit 3 and the integrator 4 of the first preferred embodiment. All the constructions and functions of the first embodiment remain unchanged with the same reference numerals for the same components.

The second compensation circuit 8 comprises a thermistor 802 with negative resistance-temperature coefficient to control the output voltages of the compensation circuit 3 in response to the changes of the ambient temperatures to the battery 11 and a resistor 801 to regulate the output voltages applied to the thermistor 802. The thermistor 802 is connected at its one end to the output terminal 319 of the compensation circuit 3 through the resistor 801 and connected at its other end to the anode 404 of the memory element 402 through the resistor 401 and the first switch 407. For detection of the temperature of the battery 11, the thermistor 802 may be mounted on a portion of a housing of the battery 11 or soaked within the battery electrolyte provided that it is protected against the electrolyte. Thus, the thermistor 802 controls the compensated voltages to be applied to the anode 404 of the potential memory element 402 from the compensation circuit 3 in accordance with the ambient temperatures to the battery 11, thereby to compensate the changes of the state-of-charge of the battery 11 affected by its ambient temperatures.

In this third embodiment, when a compensated voltage appears at the output terminal 319 of the operational amplifier 311 by way of the shunt resistor 1a, the amplifying circuit 2 and the compensation circuit 3, the compensated voltage is controlled by the resistor 801 and the thermistor 802 in accordance with the change of ampere-hour of the battery 11 caused by the ambient temperature and is applied to the anode 404 of the memory element 402.

Although the second compensation circuit 8 is interposed between the compensation circuit 3 and the integrator 4 in the mentioned embodiment, it may also be positioned at such appropriate positions as between the output and input terminals 209 and 312 respectively of the amplifying circuit 2 and the compensation circuit 3. Provided the thermistor 802 is replaced with another thermistor of positive resistance-temperature coefficient, it may be placed in series with the feed-back resistor 202 or 310 respectively within the amplifying circuit 2 or the compensation circuit 3.

From the above disclosed embodiments, it should be understood that the shunt resistor 1a of the motor driving circuit 1 can be replaced with a Hall device or a magnetic resistance element to magnetically detect the voltage changes corresponding with the changes of the discharging current of the battery 11. And, also, the changes of the discharging current of the battery 11 may be detected by a resistor control device which replaces the chopper control device for the direct current motor 13. Moreover, the amplifying circuit 2 may be eliminated when the voltage signals in enough values are obtainable. Furthermore, the potential memory element 402 for the integrator 4 or 7 may be replaced with a memory device including a mercury coulometer to integrate ampere-hours corresponding with the compensated voltages from the compensation circuit 3 and an element, for example, a liquid crystal device to read the ampere-hours.

The amperemeter 505 for reading the actual state-of-charge may be replaced by another indicating device such as a digital indicator or a waringing device. Also, the present invention is applicable to such various batteries used as auxiliary accessory devices of a vehicle driven by an internal combustion engine or a battery of the type for industrial and domestic uses.

Although certain specific embodiments of the invention have been shown and described, it is obvious that many modifications thereof are possible. The invention, thereofore, is not intended to be restricted to the exact showing of the drawings and description thereof, but is considered to include reasonable and obvious equivalents.

What is claimed is:

1. An actual state-of-charge indicator for a secondary battery comprising:
    a detecting means for detecting a discharging current exerting within an electric load circuit driven by said battery;
    a compensation means for converting the discharging current to a compensated current substantially satisfying an equation $I=mI_B^n$, the characters $I$ and $I_B$ being the compensated current and the discharging current respectively, and the constants $m$ and $n$ being experimentally defined by the changes of the known fully charged capacity of said battery in relation to the changes of the discharging current to satisfy Peukert Equation;
    an integration means for storing an ampere-hour corresponding with said known fully charged battery capacity therein and detecting an actual state-of-charge of said battery by means of a difference between an ampere-hour integrated therein from said compensated current and said stored ampere-hour; and
    an indicating means for reading said actual state-of-charge of said battery.

2. An actual state-of-charge indicator as claimed in claim 1, further including a thermo-compensation means for controlling said compensated current in accordance with the temperature changes of said battery.

3. An actual state-of-charge indicator as claimed in claim 1, further including a thermo-compensation means for controlling in accordance with the temperature changes of said battery said discharging current to be compensated by said first-named compensation means.

4. An actual state-of-charge indicator as claimed in claim 1, wherein said detecting means is a shunt resistor connected with said battery within said electric load circuit.

5. An actual state-of-charge indicator as claimed in claim 4, wherein said compensation means comprises a plurality of bias resistors for controlling a voltage appearing in said shunt resistor, a plurality of diodes connected respectively with said bias resistors to selectively be conducted in accordance with the rated bias resistances of said bias resistors in respect with the value of said voltage, said rated bias resistances being defined to satisfy said equation of $I=mI_B^n$, and an operational amplifier for amplifying said voltage applied thereto across said diodes conducted selectively to be applied to said integration means.

6. An actual state-of-charge indicator as claimed in claim 5, wherein said integration means is provided with a second resistor for regulating the output of said operational amplifier, the rated resistance of said second resistor being defined in accordance with the rated value of said shunt resistor.

7. An actual state-of-charge indicator as claimed in claim 4, wherein said compensation means comprises a resistor for controlling a voltage appearing in said shunt resistor to be applied to said integration means, and a voltage dividing means for dividing said voltage in a predetermined ratio satisfying said equation of $I=mI_B{}^n$, the divided voltage being additionally applied to said integration means.

8. An actual state-of-charge indicator as claimed in claim 1, wherein said integration means is a potential memory element having a solid electrolyte, an anode deposited on one surface of said electrolyte, and a cathode and a reference electrode deposited on the other surface of said electrolyte, said memory element storing an ampere-hour corresponding with said known fully charged battery capacity on said cathode and integrating said compensated current therein to detect a difference between an ampere-hour corresponding with said compensated current and said stored ampere-hour.

9. An actual state-of-charge indicator as claimed in claim 8, wherein said potential memory element is provided with an auxiliary battery to preliminarily store on said cathode an ampere-hour coresponding with said known fully charged battery capacity.

10. An actual state-of-charge indicator as claimed in claim 2, wherein said thermo-compensation means is a thermistor interposed between the output of said first-named compensation means and the input of said integration means.

* * * * *